US006264342B1

(12) United States Patent
von Hagen

(10) Patent No.: US 6,264,342 B1
(45) Date of Patent: Jul. 24, 2001

(54) ILLUMINATING DEVICE

(75) Inventor: Ulrich von Hagen, Iserlohn (DE)

(73) Assignee: VH Lichttechnische Spezialgerate GmbH (DE)

( * ) Notice: Subject to any disclaimer, the term of this patent is extended or adjusted under 35 U.S.C. 154(b) by 0 days.

(21) Appl. No.: 09/362,351

(22) Filed: Jul. 27, 1999

(51) Int. Cl.$^{7}$ .......... G03B 15/02

(52) U.S. Cl. .......... 362/17; 362/33; 362/341; 362/346; 362/296; 362/138; 362/139; 362/269

(58) Field of Search .......... 362/17, 33, 269, 362/138, 139, 341, 346, 296

(56) References Cited

U.S. PATENT DOCUMENTS

| | | | | |
|---|---|---|---|---|
| 1,596,831 | * | 8/1926 | Hanna | 362/297 |
| 1,782,629 | | 11/1930 | Pape . | |
| 3,686,495 | | 8/1972 | Medley . | |
| 4,007,365 | | 2/1977 | Stempfle et al. . | |
| 4,872,098 | | 10/1989 | Romano . | |
| 4,991,065 | * | 2/1991 | Engel | 362/33 |
| 5,440,467 | * | 8/1995 | Lautzenheiser | 362/222 |

FOREIGN PATENT DOCUMENTS

| | | |
|---|---|---|
| 202652 | 3/1959 | (AT) . |
| 379 006 | 11/1985 | (AT) . |
| 2523643 A1 | 12/1976 | (DE) . |
| 2533873 A1 | 2/1977 | (DE) . |
| 7931248 U1 | 10/1979 | (DE) . |
| 2920062 A1 | 11/1979 | (DE) . |
| 8316218 U1 | 8/1984 | (DE) . |
| 8528706 U1 | 10/1985 | (DE) . |
| 3708024 A1 | 9/1987 | (DE) . |
| 3822303 A1 | 6/1989 | (DE) . |
| 9204375 U1 | 7/1992 | (DE) . |
| 9302735 U1 | 6/1993 | (DE) . |
| 0316532 A2 | 5/1989 | (EP) . |
| 2653530 A1 | 4/1991 | (FR) . |
| 1482743 | 8/1977 | (GB) . |
| 2113864 | 8/1983 | (GB) . |

* cited by examiner

*Primary Examiner*—Sandra O'Shea
*Assistant Examiner*—Ali Alavi
(74) *Attorney, Agent, or Firm*—Cantor Colburn LLP

(57) ABSTRACT

To achieve the object to improve an illuminating device to the effect that such a device can be produced and/or installed with a low economic outlay, can be adjusted easily, is variable with regard to the place of use, and is dependable overall, the illuminating device is improved by virtue of the fact that the at least one light source, the at least one deflecting reflector and (lacuna) at least one reflecting surface are connected to one another to form an assembly to be positioned in an appropiate position relative to surface to be illuminated, and control means for switching and dimming said at least one light source are provided including at least one dimmer switch to be positioned near an operator position independently from said assembly.

17 Claims, 5 Drawing Sheets

ILLUMINATING DEVICE

Figure 1:
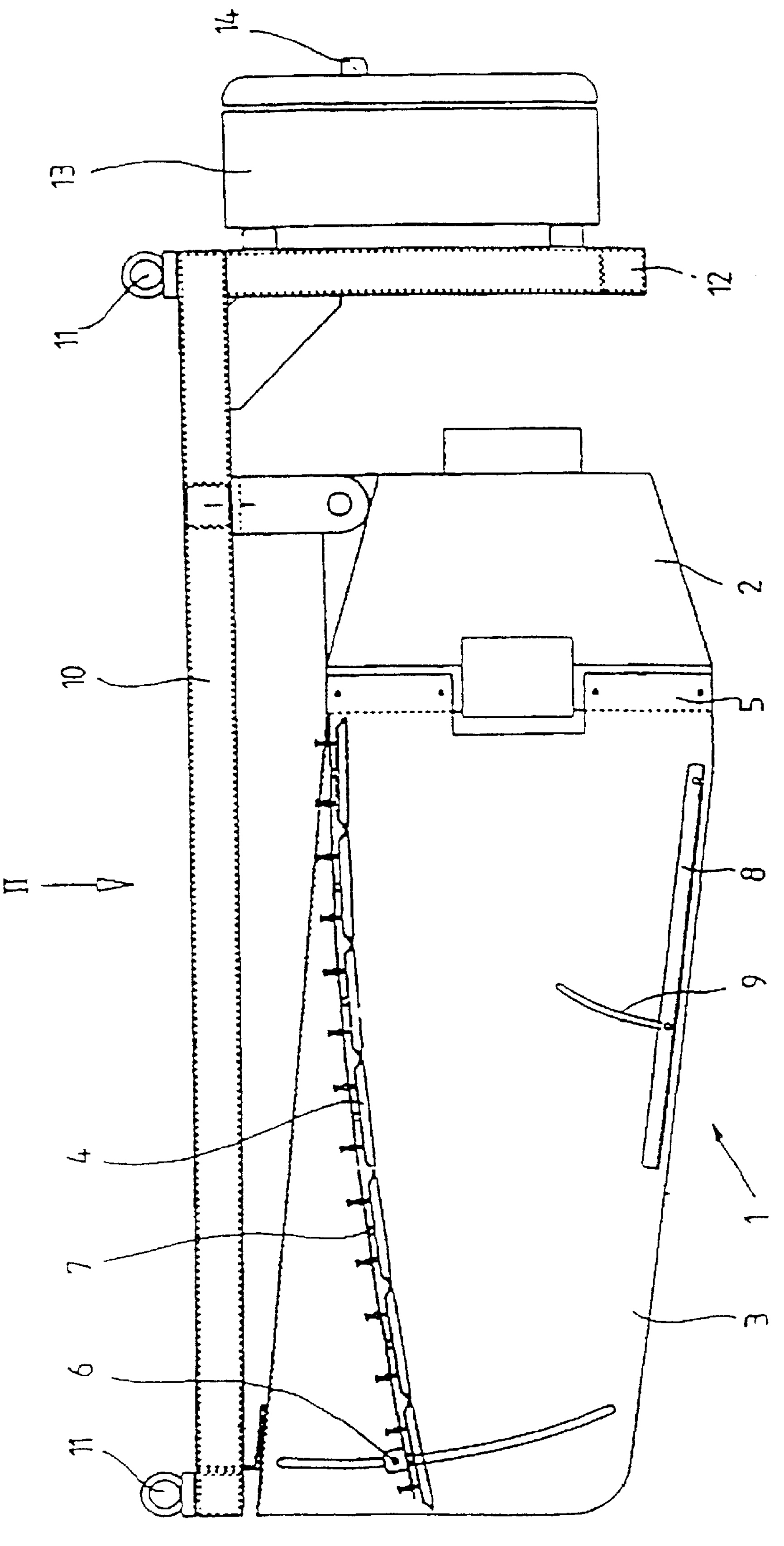

The invention relates to an illuminating device, in particular for use in quality inspection procedures, having at least one light source, at least one deflecting reflector and at least one reflecting surface.

Illuminating devices of the generic type are known per se. In the case of industrial production processes, quality inspection procedures which also include visual quality inspection are carried out in the region of the production lines. It is known that informative visual quality inspection is a function of the illumination of the monitored regions and of the monitored products. For this purpose, illuminating devices are assembled in which the light of a light source is deflected by deflecting, reflectors to irradiate a reflecting surface remote from the light source. So-called light sails, which are assembled from a multiplicity of reflecting vanes, are preferably used as reflecting surface. The light is reflected from the light sail in the desired way onto the region to be monitored.

In order to ensure optimum illuminating conditions, the light source, the deflecting reflectors and the reflecting surface must be optimally aligned relative to one another, and the deflecting reflectors and, in particular, the reflecting surface must be accurately adjusted. Such installations are very complicated and are arranged as fixed installations in the region of the production lines.

A disadvantage of this previously known device consists in that the installation of the components must be planned with very great care. Even small errors in the preliminary installation, of the holding devices for example, can lead to illuminating conditions which are useless. Owing to the fixed installation, the previously known illuminating device is very complicated and cost intensive, both with regard to the parts used and regard to assembly. Finally, the previously known illuminating device is vulnerable, since, in particular, the light source and the associated deflecting reflectors are arranged in the production or operating region and can easily be inadvertently displaced. The lighting conditions can be unfavourably influenced because of the spacing of the illuminating device from the light sail. Since, however, it is important for the desired visual quality inspection that the beam path of the light is exactly defined, that is to say that the mixture of light, parallelism and the like are neatly determined, such disturbances can affect the entire production.

The further problem is that known illuminating devices are used in that and the operator is searching on the illuminating device, is awaiting a certain period to adapt his eyes to the illumination situation and than checking or inspecting surfaces which are moved relative to the illuminating device under the given illumination conditions. There is no possibility to check or inspect surfaces under changing illuminating conditions frequently.

A further problem is that the given illuminating conditions can not be adjusted due to colours of the surfaces to be inspected. Furthermore known systems do not provide any assistance using digital devices or inspection and/or documentation, purposes.

It is the object of the invention, starting from this point, to improve an illuminating device of the generic type to the effect that such a device can be produced and/or installed with a low economic outlay, can be adjusted easily, is variable with regard to the place of use, and is dependable overall.

To achieve this object technically, the illuminating device of the generic type is improved by virtue of the fact that the at least one light source, the at least one deflecting reflector and (lacuna) at least one reflecting surface are connected to one another to form an assembly to be positioned in an appropriate position relative to surface to be illuminated, and control means for switching and dimming said at least one light source are provided including at least one dimmer switch to be positioned near an operator position independently from said assembly.

The illuminating device according to the invention makes it possible for the light source, the deflecting reflector and the reflecting surface to be aligned relative to one another in a basic setting, in order to be arranged subsequently as a standardized assembly relative to the region to be monitored. This greatly simplifies the adjustment of the illuminating device, and thus the use of such devices becomes more economic. Furthermore, all the components of the device can be arranged in a dependable region relative to the region to be monitored. Independent from said standardized assembly a dimmer switch blowing to the controlling for dimming said light source can be positioned near by an operator position. The operator can therefore easily change the illumination conditions. The dimmer switch can provide a multilevel-dimmer. For example a six-level dimmer switch can include the level on =100%, level 1=95%, level 2=70% level 3=50%, level 4=35% and off. Variations are within the spectrum of the invention. The operator can therefore evaluate the reaction of the illumination condition with regard to the surface to be inspected.

The light source is advantageously a luminaire having a housing with an essentially rectangular frontage. In accordance with an advantageous proposal of the invention, the deflecting reflector is arranged on the light source housing in the region of the front surface. The deflecting reflector can then have the form required for the application, with the result that the desired illumination can be achieved. If, as further proposed in an advantageous way, the reflecting surface is arranged inside the deflecting reflector, the entire illuminating device is unipartite in nature, the luminaire housing being enlarged by the deflecting reflector, and the required reflecting surface being arranged in the deflecting reflector. The light source can expediently be provided with at least one filter, which is arranged in the beam path. The quality, the radiation area and, if appropriate also the polarization of the light can be prescribed by the appropriate filters.

This essentially unipartite design can easily be arranged in the region of a ceiling of al laboratory or of a production area. All that is then required is for the reflectors to be adjusted relative to one another in such a way that the desired illumination is obtained in the region envisaged therefore. In an advantageous way, the reflector surface is a light sail, which advantageously comprises individual reflector vanes. It is therefore advantageously possible for the entire light sail to be adjustable or, in addition or alternatively, also for individual reflector vanes to be adjusted.

It is advantageously proposed that an adjustable dim-out flap is arranged in the deflecting reflector opposite the light sail. In this way, the beam path of the light can be bounded and set.

In order to improve the adjustability and the variable use of the illuminating device according to the invention, it is proposed that the unit of light source, deflecting reflector and reflecting surface be arranged on a supporting structure. Such a supporting structure can be provided with fastening devices in order to ensure simple fastening in the monitoring region. The switchgear cabinet required for illumination operation and in which a dimmer device is advantageously accommodated is advantageously arranged on the supporting structure.

The number of the light sources, the deflecting reflectors and the reflecting surfaces is determined by the required range of use. Because of the integrated design, the illuminating device according to the invention can be produced and adjusted cost effectively with few components. Moreover, the device can be used in a most variable fashion and is only slightly vulnerable.

According to a further aspect of the invention interfering lamps and/or colour filters can be included into the system. The interfering lamps can be chosen to interfere the illumination of the device to strengthen or weaken predetermined frequencies. The colour filter can be used to filter predetermined frequencies. Both, lamps and filters, can be used to produce a special inspection light which is completely adapted to the surface to be inspected to provide optimal conditions.

Due to the produced parallelity of the light which has a nearly a parallelized character, digital cameras can be edit to assist the inspection and/or a documentation. The positioning of the camera hands on the illumination condition orientation of the light.

Figure 2:
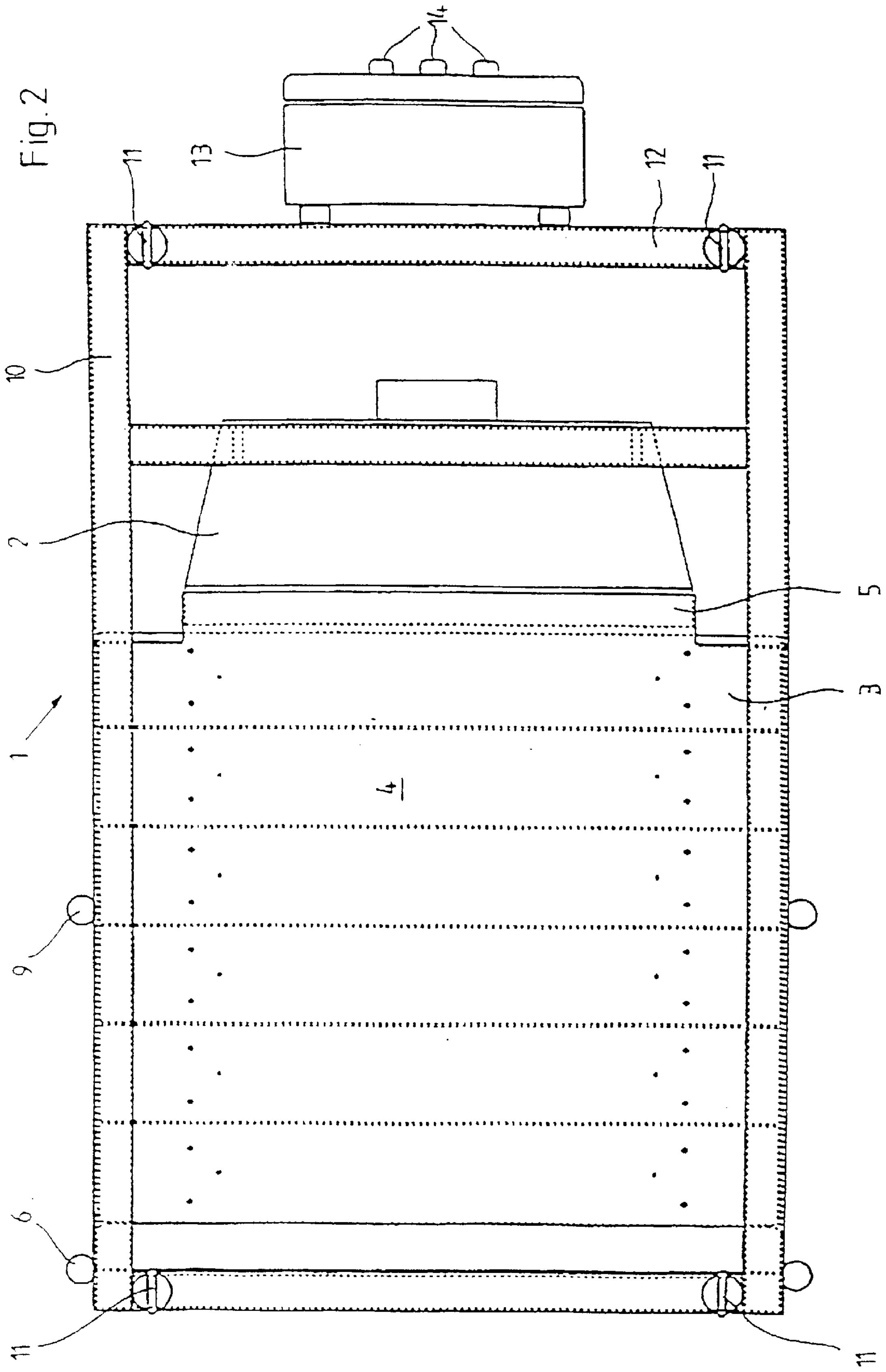
Figure 3:
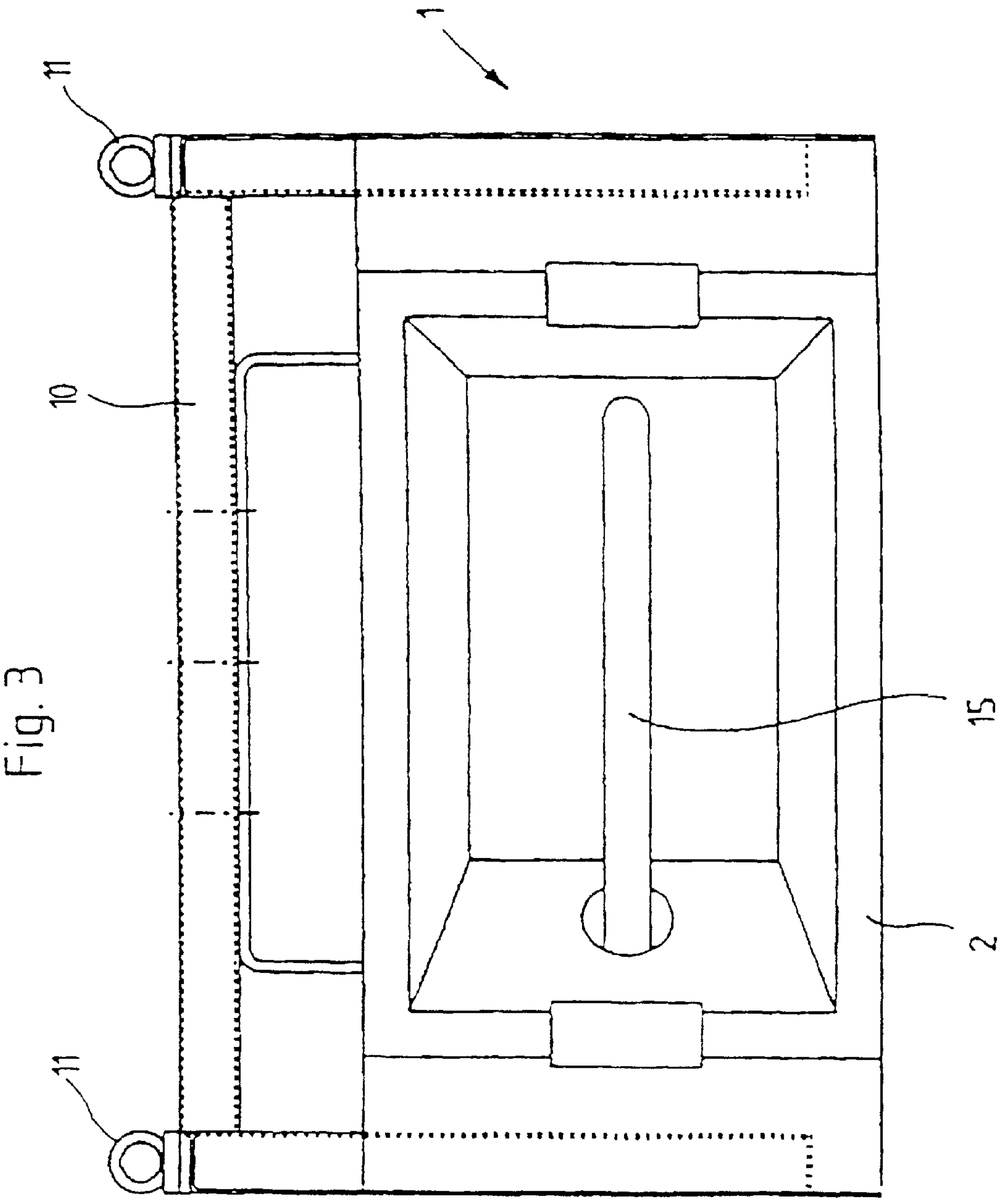
Figure 4:
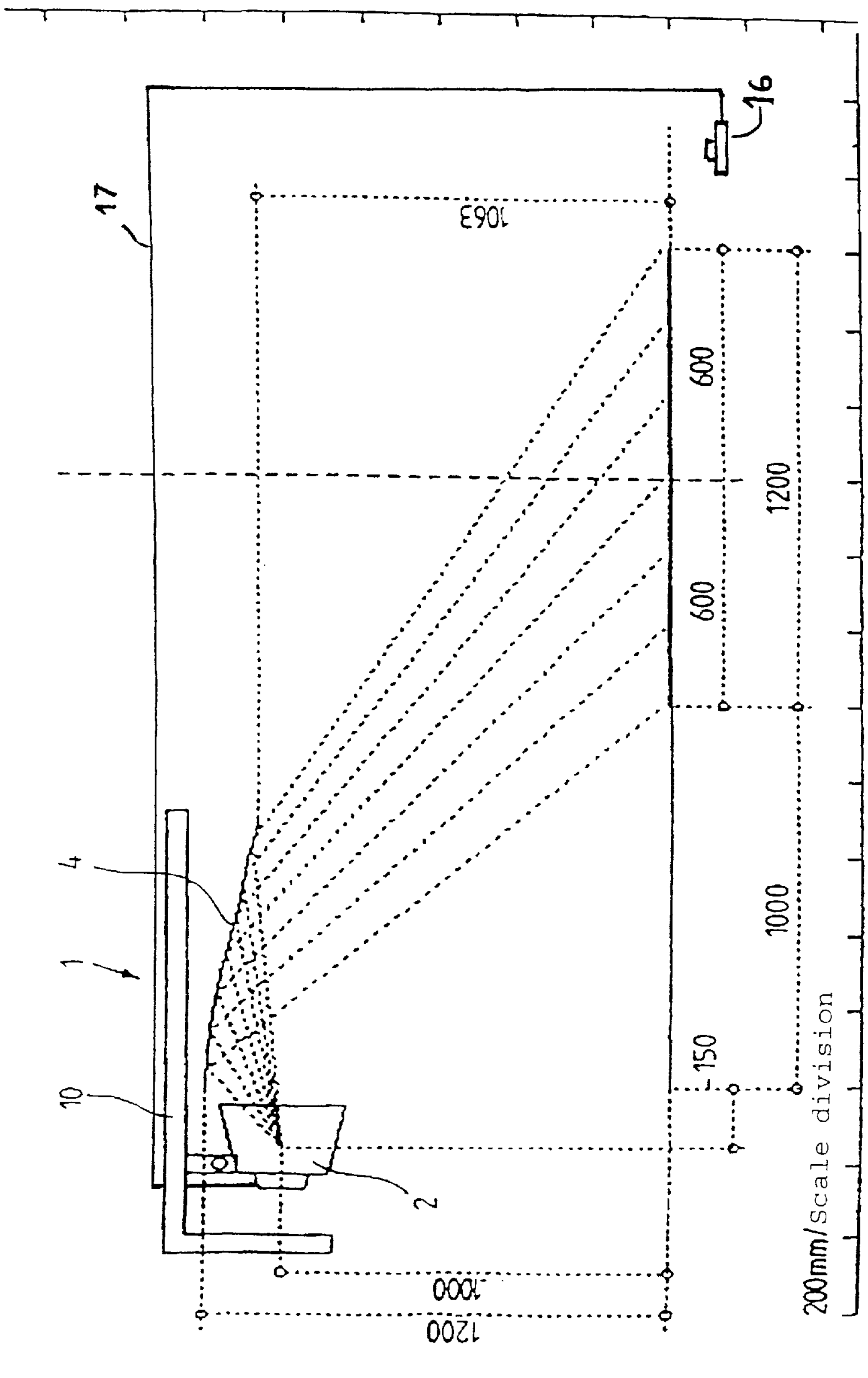
Figure 5:
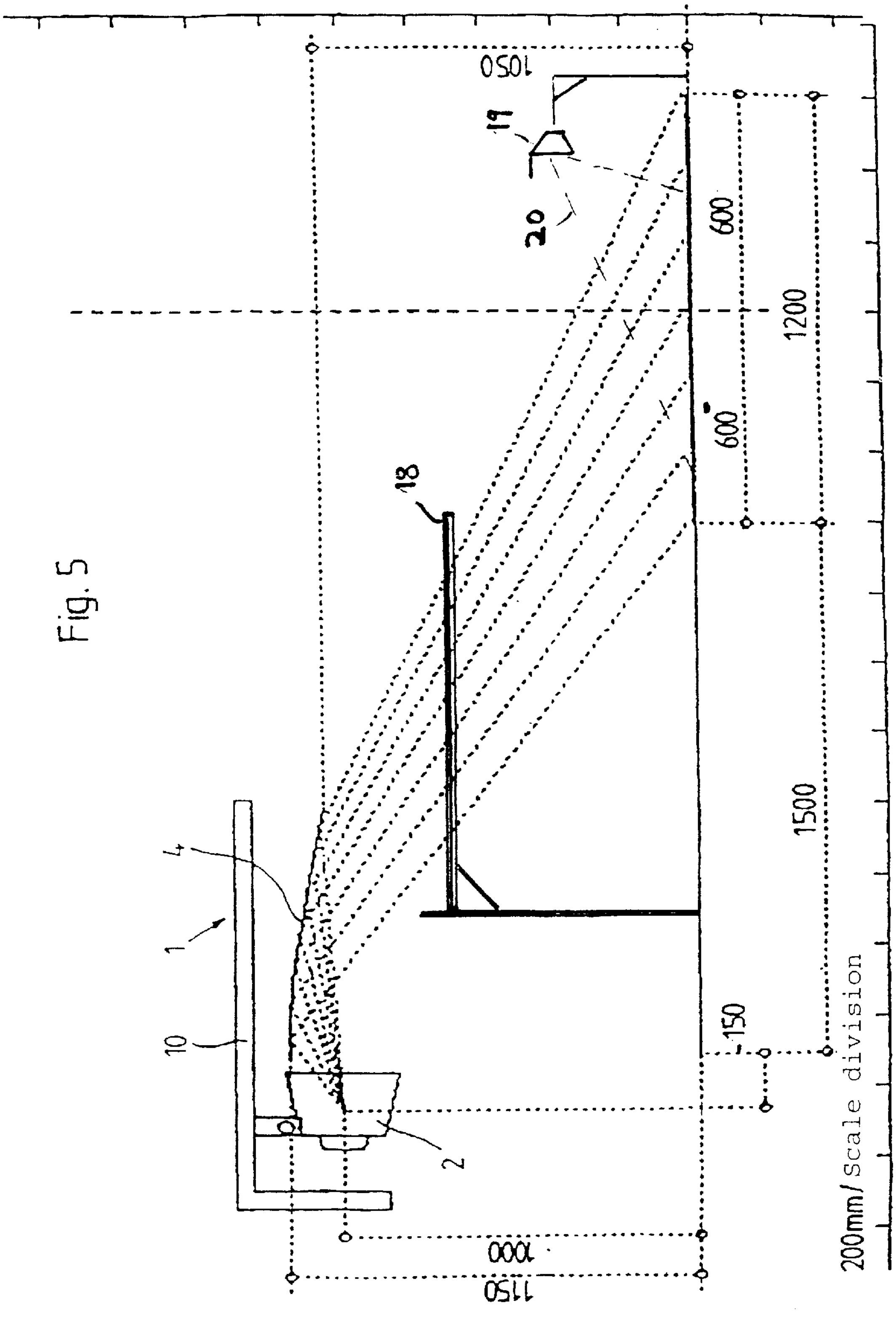

Further advantages and features of the invention emerge from the following description with the aid of the figures, in which:

FIG. 1 shows a diagrammatic side view of an exemplary embodiment of an illuminating device according to the invention, FIG. 2 shows a top view in the direction of the arrow 11 in accordance with FIG. 1, FIG. 3 shows a front view of the luminaire arranged on the supporting structure, FIG. 4 shows a diagrammatic representation of the beam path of the light in the case of a first setting of the device, and FIG. 5 shows a representation in accordance with FIG. 4 for a second setting of the illuminating device.

As shown in FIGS. 1 to 3, the illuminating device 1 comprises a luminaire 2, a deflecting reflector 3 and a reflecting surface 4. The deflecting reflector 3 is fastened to the luminaire 2 at the connecting region 5. The reflecting surface 4 is fastened, for its part, to the deflecting reflector 3 and can be adjusted via a mimetic adjuster 6. The reflecting surface compromises individual reflecting vanes 7 which, for their part, can be adjusted relative to one another.

Arranged in the beam exit region on the deflecting reflector is a dim-out flap 8 which, in a fashion rotatably mounted at one side, can be adjusted relative to the beam path by a mimetic adjuster 9. The assembly comprising a luminaire 2, deflecting reflector 3, reflecting surface 4 and dim-out flap 8 is arranged on a supporting structure 10. This is a lightweight supporting structure to which the assembly is fastened by means of retaining lugs. Eyebolts 11 for fastening the illuminating device 1 in the monitoring region are arranged on the supporting structure 10. An attachment section 12, to which the switchgear cabinet 13 with an operator's panel 14 is fastened, is attached to the supporting structure 10. The overall unit thus produced can be used in the most varied places and can be produced and adjusted economically with regard to the individual elements. The external dimensions of such a device are, for example, 1.4 metres×0.7 metres×0.5 metres. The device can, for example, be suspended from a ceiling by means of chains, for which purpose quick assembly element (sic) such as snap hooks or the like can be used. As is to be seen in FIG. 2, simple operating elements for example plastic balls, which are easy to operate from outside are arranged on the mimetic adjuster. Inserted into the luminaire 2 is a lamp 15 which can, for example, be a 250 to 400 watt lamp.

As emerges from FIGS. 4 and 5, the illumination region can be adjusted optimally by use of the illuminating device I according to the invention. In FIG. 4, the reflecting surface 4 is located in its position arranged on the luminaire in a fashion adjusted such that after approximately one metre from beam exit from the luminaire housing an illuminated monitoring region with a length of approximately 1.2 metres results. In accordance with FIG. 5, it is possible by lowering the reflecting surface for this monitoring region to be moved to a different spacing from the illuminating device. The dimensions specified in FIGS. 4 and 5 are selected only by way of example to illustrate the exemplary embodiment.

FIG. 4 discloses a by example by dimmer switch 16 which is connected with a switchgear cabinet 13 of the luminaire 2 by a connector 17 and positioned in the region of an operator who he inspecting the surface. So the operator can switch, the luminaire 2 in several mode to test the influence changing illumination conditions to the inspection.

FIG. 5 discloses to use a filter 18 to produce a special inspection illumination. Furthermore a lamp 19 can produce interference light 20 to influence the production of inspection illumination, too. In the same way as the lamp 19 is indicated a digital camera can be positioned to assist the automatic inspection and/or the documentation of the inspection.

What is claimed is:

1. An illuminating device for use in visual quality inspections, comprising:

at least one light source for emitting a light;

at least one deflecting reflector; and at least one reflecting surface;

wherein a first portion of the light radiates from the at least one light source onto the at least one deflecting reflector which directs the first portion of the light onto the reflecting surface;

wherein a second portion of the light radiates from the at least one light source directly onto the reflecting surface; and wherein the reflecting surface directs the first and second portions of the light onto a target surface of an article to be inspected, the article being situated outside the device, the at least one light source, the at least one deflecting reflector, and the at least one reflecting surface being connected to one another to form an assembly to be positioned in an appropriate position relative to the target surface of the article to be inspected, and the device further comprising a controller for switching and dimming the at least one light source including at least one dimmer switch positioned near an operator position independent from the assembly.

2. The illuminating device according to claim 1, wherein the at least one light source is a luminaire with an essentially rectangular front surface.

3. The illuminating device according to claim 1, wherein the at least one deflecting reflector is fastened to the at least one light source.

4. The illuminating device according to claim 1, wherein the at least one reflecting surface is arranged in the at least one deflecting reflector.

5. The illuminating device according to claim 1, wherein the at least one reflecting surface is a light sail.

6. The illuminating device according to claim 5, wherein the light sail comprises individual reflecting vanes.

7. The illuminating device according to claim 1, wherein the at least one reflecting surface can be adjusted relative to a beam path of the light.

8. The illuminating device according to claim 6, wherein the individual reflecting vanes can be adjusted relative to a beam path of the light.

9. The illuminating device according to claim 1, further including a dim-out flap arranged in the at least one deflecting reflector.

10. The illuminating device according to claim 9, wherein the dim-out flap is adjustable.

11. The illuminating device according to claim 1, wherein the assembly is fastened to a supporting structure.

12. The illuminating device according to claim 11, wherein the supporting structure is produced from lightweight sections.

13. The illuminating device according to claim 11, further including a switchgear cabinet for the illuminating device is fastened to the supporting structure.

14. The illuminating device according to claim 1, wherein the dimmer switch provides multilevel dimming.

15. The illuminating device according to claim 1, further including interfering lamps.

16. The illuminating device according to claim 1, further including a color filter.

17. The illuminating device according to claim 1, further including a digital camera.

* * * * *